UNITED STATES PATENT OFFICE.

THOMAS JONES, OF ACME, TEXAS.

CEMENT.

No. 853,175.  Specification of Letters Patent.  Patented May 7, 1907.

Application filed December 26, 1905. Serial No. 293,373.

*To all whom it may concern:*

Be it known that I, THOMAS JONES, a citizen of the United States, and a resident of Acme, in the county of Hardeman and State of Texas, have invented a new and Improved Cement, of which the following is a full, clear, and exact description.

My invention relates to cements, my more particular object being to produce a type of cement analogous to the well-known article of commerce ordinarily designated as "Keene's cement."

The so-called Keene's cement, generally speaking, is a gypseous plaster well known and extensively used in England (where it originated), and also upon the continent of Europe. It is employed in instances where a high degree of finish combined with extreme hardness and strength are required for plaster work. The original method of its manufacture consisted in steeping dehydrated gypsum in alum solution and then recalcining. The process, however, was quite expensive. Numerous futile attempts have been made in the United States to manufacture this cement or its equivalent and repeated failures have resulted. These are due, no doubt, to imperfect acquaintance with the nature and chemical properties of the essential materials, and also to the proper method of treatment of these materials. It is probable that many fallacious statements as to the method of manufacture of this cement, which have been given publicity in various technical publications, are mainly responsible for ignorance of the essential requisites for the production of the cement.

The object of my present invention is to produce a material of the general nature of so-called Keene's cement, my product being a material of the highest grade and excellence and made by the most direct method and at the least possible expense. I employ only one calcination. The plasticity and ultimate hardness of the product are brought about by chemical substances added together as hereinafter described.

The first step in my method is the selection of pure gypsum rock. This must be practically free from magnesia and iron. If magnesia be present in the rock it causes the formation of magnesium sulfate, which is devastatious, and the presence of iron even in very minute quantities causes the formation of iron salts which weaken the finished cement and also discolor the same. Pure gypsum rock having been found in a suitable quantity I break the rock into pieces of convenient size, preferably each of about twenty pounds weight, and then calcine the broken rock in a suitable kiln or oven until the entire charge is of a full red heat. The calcination may be effected either in contact with the gases of combustion or out of contact therewith, the main requisite being that the rock be subjected continuously to a perfectly oxidizing atmosphere. This may be accomplished by the admission of an amount of air to the fire-box or flue sufficient to oxidize completely the fuel gases before their entrance into the kiln or oven. When the gypsum rock has been perfectly calcined and is afterward cooled I transfer it to a crusher and then to a mill in which it is reduced to a fine powder. This powder (anhydrous sulfate of lime) is laid aside for the moment. I now take of caustic potash two hundred and twenty-four (224) pounds, which I dissolve in twenty (20) gallons of water in an iron pan which I heat from beneath. The solution is thus caused to boil, and while boiling hot I add to the solution three hundred and sixty (360) pounds of a pure and finely comminuted silicious sand. Under suitable conditions, however, a smaller proportion of the sand will suffice, various proportions thereof being employed according to purity of the materials. I keep the solution boiling and constantly agitated until all of the water has been driven off; a viscous mass remains which rapidly sets and hardens. I allow the mass to cool, and I break it into fragments of convenient size. These I place in a suitable oven or reverberatory furnace and burn them at a full red heat (substantially as above described with reference to the gypsum rock) for a period of eight or ten hours until incipient vitrification ensues. I then allow the mass to cool. I next pass this vitrified product (which consists of bi-silicate of potash) through a crusher and from thence into a pebble mill or other suitable grinding apparatus, introducing at the same time for every one hundred and sixty (160) pounds of bi-silicate eighty-seven (87) pounds of tribasic sulfate of alumina, sometimes designated as aluminite ($Al_2O_3SO_3.9H_2O$) and grind the two compounds together until reduced to an impalpable powder. The effect of this operation is to break up the combinations, the potash eagerly taking the acid from the alumina, thereby forming potassium sulfate, with nascent silica and anhydrous alumina mixed therewith. The nascent silica and the anhydrous alumina do not combine for the reason that at the temperature of grinding the affinity of these radicals is not sufficient to enable them to break up. Such part of the bi-silicate compound as may have been reduced to a lower state of oxidation (indicated by a change of color to a deep brown) I detach from the vitrified mass before the crushing and grinding above described. The parts thus detached are in lumps which I then place in a lead lined tank containing a solution consisting of one part of sulfuric acid and four parts of water, by weight, and allow the lumps to remain until the mass by slaking becomes disintegrated and assumes the desired natural light color. After drying the substance is a powder which I add to the general mass of crushed bi-silicate above described. I add this powder before weighing out the one-hundred and sixty pounds of bi-silicate as above stated. I so regulate the proportion of acid to the mass of silicate as to be in slight excess of what is required to combine with the whole of the potash, and form neutral potassium sulfate. When this stage has been reached I dry the product (which now consists of gelatinous silica and potassium sulfate) at a heat sufficient to drive off all the moisture and then grind to a fine powder in a suitable mill, at the same time adding thereto and grinding therewith (for every 178 pounds of neutralized silicate) thirty-five pounds of calcined di-basic sulfate of alumina prepared as stated below. As the product of this operation is by the addition of the sulfate of alumina substantially identical in composition with that previously described, namely, nascent silica, potassium sulfate and anhydrous alumina, I merely mix the two powdered compounds together and call the mixture No. 1.

Number 2 compound is made by calcining tri basic aluminium sulfate for seven or eight hours at a red heat in a perfectly oxidizing atmosphere, after which I allow it to cool. I next grind it to an impalpable powder as described for No. 1.

In calcining the di-basic aluminium sulfate it is maintained at a red heat during the time just stated. The result of this operation is that one-half of the acid is expelled so that the substance thus operated upon consists partly of dehydrated alumina and partly of sub-sulfate of alumina. While the object aimed at here is to expel all of the sulfuric oxid ($SO_3$) the retention of approximately one-half of it occasions no difficulty, for the reason that there is always enough caustic lime in the burnt gypsum to take up and combine with the acid left in the sub-sulfate, and so the net result is not affected, whether all of the sulfuric oxid be expelled or not. I find in practice that about one-half of the sulfuric oxid does in fact remain under the conditions stated and serves to neutralize the caustic lime in the burnt gypsum. It also assists in the calcination in the sense that it lessens the cost of fuel. To complete the manufacture of the cement, to one ton of two thousand pounds of burnt and powdered gypsum I add of No. 1 compound made as described above, and consisting of nascent silica, potassium sulfate and anhydrous alumina, sixty (60) pounds, and of No. 2 compound fifty (50) pounds and thoroughly mix the two compounds and the powdered gypsum together. This completes the process for the regular form of cement which is used for general purposes and sets in thirty to forty-five minutes.

I do not confine myself to the exact proportions named, as these may be varied to some extent according to the quality of the materials. The proportions given are based upon experiment, however, and are excellent when ordinary commercial materials are used.

Where it is desired to produce a cement setting very slowly, such, for instance, as is used for imitation marble wherein neither alkaline salts nor acids are admixed, I wash out with hot water the potassium sulfate, and use only the heated gelatinous silica in conjunction with the residual powder obtained by burning di-basic sulfate of alumina. I employ the proportions of thirty (30) to forty (40) pounds of the silica to sixty (60) pounds of the powder left after burning the di-basic aluminium sulfate.

In all the instances above described, the finished product surpasses the usual grade of Keene's cement found upon the market.

As will be seen from the above description I obtain the isolation of both silica and alumina from their combinations, and that I accomplish this result by grinding a silicate with alumina sulfate, or by treating a silicate with sulfuric acid and subsequently adding burnt aluminium sulfate.

Having thus described the preferred form of my invention, what I claim as new and desire to secure by Letters Patent is:

1. The method herein described of preparing cement, which consists in selecting comparatively pure gypsum rock, breaking the same, calcining said rock in an oxidizing atmosphere, crushing the residuum to powder, preparing potassium silicate and di-basic aluminium sulfate, grinding together the two last mentioned substances, and adding said substances to the powder made from said gypsum rock.

2. The method herein described of preparing cement, which consists in calcining gypsum in an oxidizing atmosphere, crushing the residuum to a powder, admixing caustic potash and silicious sand so as to form a silicate therefrom, admixing said silicate with di-basic aluminium sulfate, grinding said silicate and said sulfate together so as to form an impalpable powder and promote chemical action therebetween, and admixing the resulting substance with said first-mentioned powder obtained from said gypsum.

3. The method herein described of preparing cement, which consists in calcining gypsum, reducing the same to an impalpable powder, calcining di-basic aluminium sulfate and reducing it to a powder, and admixing the two powders thoroughly together in the approximate proportion of fifty (50) pounds of di-basic aluminium sulfate to two thousand (2000) pounds of said calcined gypsum.

4. The method herein described of preparing cement, which consists in burning gypsum in an oxidizing atmosphere, reducing said gypsum to a powder, preparing potassium silicate, vitrifying and crushing the same, adding eighty-seven (87) pounds of di-basic aluminium sulfate to each one hundred and sixty (160) pounds of said potassium silicate, grinding together the two last mentioned components and allowing a chemical action to take place so as to produce thereby anhydrous alumina, potassium sulfate and silica, then adding the admixture of these substances last mentioned to said powder produced from said gypsum in the proportion of sixty (60) pounds of the admixture of alumina, potassium sulfate and silica to every two thousand (2000) pounds of said powder produced from said gypsum.

5. The method herein described of preparing cement, which consists in calcining gypsum, reducing the same to a powder, and admixing therewith calcined di-basic aluminium sulfate likewise in the form of a powder.

6. The method herein described of preparing cement, which consists in calcining gypsum, reducing the same to a powder, calcining di-basic aluminium sulfate, reducing the latter to a powder, and admixing said powders together in the proportion of two thousand (2000) pounds of the powder derived from said gypsum to sixty (60) pounds of said powder derived from said calcined di-basic aluminium sulfate.

7. The method herein described of preparing potassium bi-silicate, which consists in dissolving caustic potash in water, boiling the solution thus formed, adding silica to said solution while the latter is boiling, drying off the water so as to leave a solid mass and calcining the same, and admixing sulfuric acid with said mass for the purpose of nullifying the effect of any undesirable reduction of said silica.

8. The method herein described of preparing cement, which consists in reducing a silicate containing free potassium sulfate, in dissolving out said potassium sulfate so as to remove the same, and admixing the residuum with burned di-basic sulfate of alumina in the proportion of thirty (30) to forty (40) pounds of silica to sixty (60) pounds of the burnt di-basic aluminium sulfate.

In testimony whereof I have signed my name to this specification in the presence of two subscribing witnesses.

THOMAS JONES.

Witnesses:
M. M. HAWKINS,
A. D. DECKER.